(12) United States Patent
Hendler et al.

(10) Patent No.: US 10,304,224 B2
(45) Date of Patent: May 28, 2019

(54) DYNAMIC GRAPHIC ENTITY DETERMINATION

(71) Applicant: HEWLETT-PACKARD DEVELOPMENT COMPANY, L.P., Houston, TX (US)

(72) Inventors: Yirat Hendler, Yehud (IL); Pinhas Houri, Yehud (IL); Haim Shuvali, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 267 days.

(21) Appl. No.: 15/307,435

(22) PCT Filed: May 28, 2014

(86) PCT No.: PCT/US2014/039703
§ 371 (c)(1),
(2) Date: Oct. 28, 2016

(87) PCT Pub. No.: WO2015/183253
PCT Pub. Date: Dec. 3, 2015

(65) Prior Publication Data
US 2017/0053426 A1    Feb. 23, 2017

(51) Int. Cl.
*G06F 16/26*   (2019.01)
*G06T 11/20*   (2006.01)
*G06Q 10/10*   (2012.01)

(52) U.S. Cl.
CPC ............ *G06T 11/206* (2013.01); *G06F 16/26* (2019.01); *G06Q 10/10* (2013.01)

(58) Field of Classification Search
CPC ................................................. G06F 17/30713
See application file for complete search history.

(56) References Cited

U.S. PATENT DOCUMENTS 8,131,779 B2    3/2012  Jonker et al.
8,631,325 B1*   1/2014  Langseth .......... G06F 17/30017
                                                         715/718

(Continued)

OTHER PUBLICATIONS

Battista, V. et al., "Motion Charts: Telling Stories with Statistics," American Statistical Association Joint Statistical Meetings, vol. 2273, 2011, pp. 4473-4483, available at http://www.bis.gov/osmr/pdf/st110110.pdf.

(Continued)

*Primary Examiner* — Jitesh Patel

(57) ABSTRACT

Example implementations relate to dynamic graphic entity determination. Some examples may include a data access engine to access data values. Each data value may be associated with a category and a subcategory of the category. Some examples may include a display entity determination engine to analyze the data values to determine whether an overlap of a proposed graphic representing the subcategory and a proposed graphic representing the category exceeds an overlap tolerance level. Some examples may include a visual representation generation engine to generate an actual visual representation based on the analysis. The actual visual representation may display: a single consolidated graphic representing at least the category and the subcategory if the overlap does not exceed the overlap tolerance level; or the subcategory as a separate graphic from a graphic representing at least a portion of the remainder of the category if the overlap exceeds the overlap tolerance level.

14 Claims, 8 Drawing Sheets

(56) References Cited

U.S. PATENT DOCUMENTS

| | | | |
|---|---|---|---|
| 2002/0152222 A1* | 10/2002 | Holbrook | G06F 17/30696 |
| 2005/0052474 A1 | 3/2005 | Cardo | |
| 2008/0163085 A1* | 7/2008 | Subbu | G06F 9/451 |
| | | | 715/763 |
| 2008/0288889 A1 | 11/2008 | Hunt et al. | |
| 2009/0235267 A1* | 9/2009 | McKinney | G06F 11/328 |
| | | | 718/104 |
| 2010/0079464 A1 | 4/2010 | Matsumura | |
| 2011/0242108 A1 | 10/2011 | Mital et al. | |
| 2011/0251875 A1* | 10/2011 | Cosman | G06Q 30/0254 |
| | | | 705/7.31 |
| 2012/0102396 A1 | 4/2012 | Arksey et al. | |
| 2012/0246260 A1 | 9/2012 | Kama | |
| 2012/0290612 A1* | 11/2012 | Ritoe | G06F 17/3087 |
| | | | 707/770 |
| 2013/0106830 A1 | 5/2013 | de Loera et al. | |

OTHER PUBLICATIONS

International Search Report & Written Opinion received in PCT Application No. PCT/US2014/039703, dated Jan. 29, 2015, 10 pages.

Edited by Thomas, et al., "Illuminating the Path", The Research and Development Agenda for Visual Analytics, National Visualization and Analytics Center, 2005, 190 pages.

Wikipedia, "Bubble chart", 2013, 3 pages. <https://web.archive.org/web/20131215064203/http://en.wikipedia.org/wiki/Bubble_chart>.

\* cited by examiner

DYNAMIC GRAPHIC ENTITY DETERMINATION

BACKGROUND

Information visualization may be used to present information in a way that is easy for people to recognize and understand. For instance, information visualization can help convey large amounts data by presenting the data and/or complex relationships between the data as a visual representation. The visual representation may include symbols, illustrations, colors, and the like that present the data as well as relationships between data sets quickly and clearly. Example visual representations may include, for example, bar charts, histograms, spider charts, tree maps, waterfall charts, stream graphs, pie charts, line charts, bubble charts, and/or any other format in which data may be represented graphically.

BRIEF DESCRIPTION OF THE DRAWINGS

The following detailed description references the drawings, wherein.

DETAILED DESCRIPTION

Figure 1:
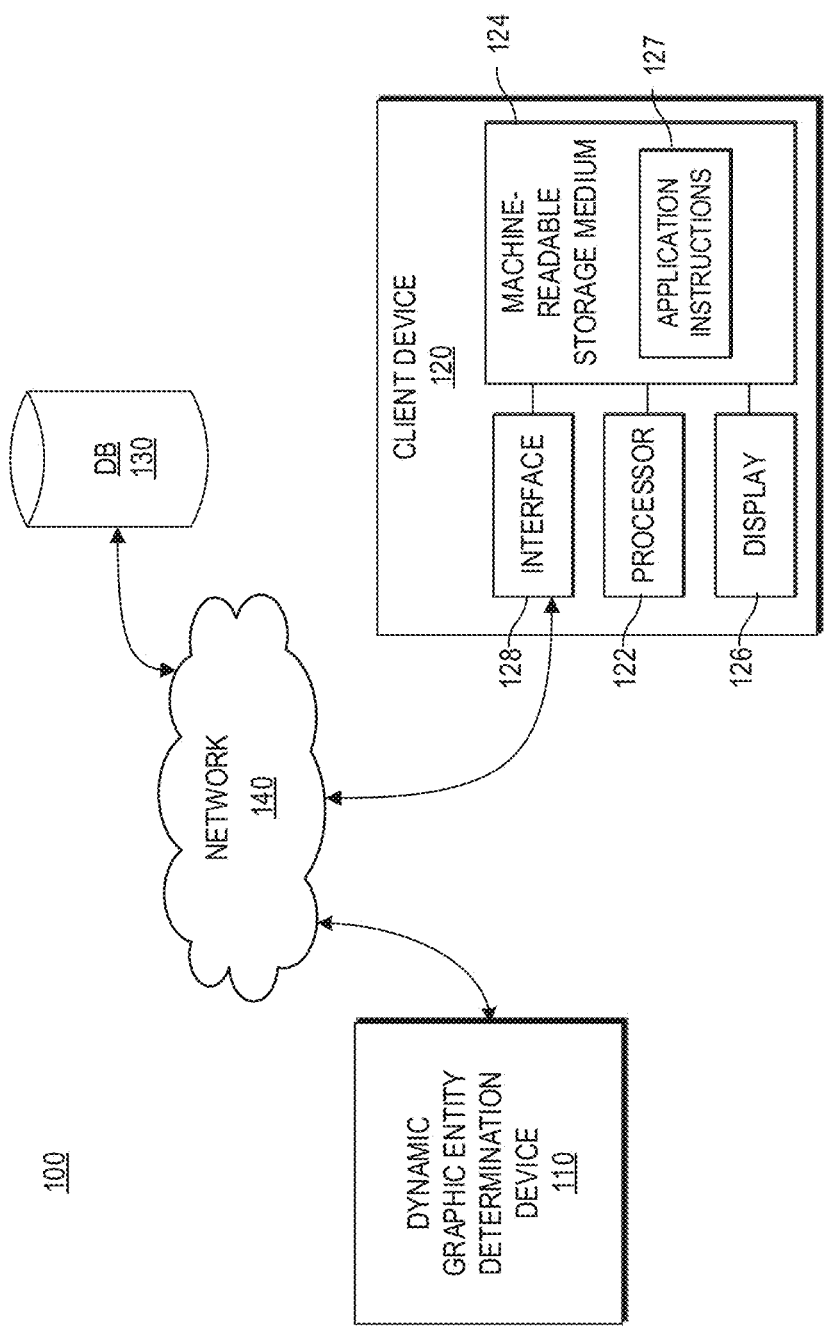
FIG. 1 is a block diagram of an example system for dynamic graphic entity determination consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, a bubble chart may be an example of a visual representation. Traditionally, a bubble chart may be used to visualize data that has been pre-categorized into entities based on a dimension of the data. For example, each entity may be plotted as a disk that expresses its entity values through the disk's x location, y location, and/or size. However, predefined entities may obscure important data from a user viewing the bubble chart. For example, an entity including multiple sub-entities may have a particular average value, but some sub-entities may have a much higher or lower value than the average value. Thus, if a bubble chart merely displayed the predefined entity, a user may not be able to obtain the necessary insight from the data that is being presented (e.g., the sub-entities with the significantly higher or lower values are not shown or otherwise obscured). Accordingly, to be able to obtain the necessary insight from data, entities should be dynamically created based on their impact to the visual representation.

Examples disclosed herein provide dynamic graphic entity determination. To this end, example implementations disclosed herein may access data values that are associated with a category and a subcategory of the category. For example, in some implementations the data values may be accessed and grouped into proposed entities and/or proposed subentities based on certain criteria. Additionally, some implementations may analyze the data to determine whether an overlap of a proposed graphic representing the category ("proposed category graphic") and a proposed graphic representing the subcategory ("proposed subcategory graphic") exceed an overlap tolerance level. In some examples, the overlap tolerance level may be determined based on a scale of a display axis of a proposed visual representation including the proposed category graphic, the proposed subcategory graphic, and/or other graphics representing other proposed categories and subcategories. Some implementations may also generate an actual visual representation based on the analysis of the data. For example, if the overlap exceeds the tolerance level, the actual visual representation may display the subcategory as a separate graphic from a graphic representing at least a portion of the remainder of the category. As another example, if the overlap exceeds the tolerance level, the actual visual representation may display a single consolidated graphic representing at least the category and the subcategory.

Referring now to the drawings, FIG. 1 is a block diagram of an example system 100 for dynamic graphic entity determination consistent with disclosed implementations. System 100 may be implemented in a number of different configurations without departing from the scope of the disclosed examples. In the example shown in FIG. 1, system 100 may include a dynamic graphic entity determination device 110, a client device 120, a database 130, and a network 140 for connecting dynamic graphic entity determination device 110 with client device 120, database 130, and/or other components not shown in FIG. 1.

Dynamic graphic entity determination device 110 may be a computing system that performs various functions consistent with disclosed examples, such as dynamically determining entities to display on a chart. For example, determination device 110 may be a desktop computer, a laptop computer, a tablet computing device, a mobile phone, a server, and/or any other type of computing device. In some examples, determination device 110 may process information received from client device 120, database 130, and/or another device. For example, determination device 110 may access data values associated with categories and subcategories, analyze the data to determine whether a proposed subcategory graphic overlaps a proposed category graphic beyond an overlap tolerance level, and generate an actual visual representation based on the analysis. Examples of determination device 110 and certain functions that may be performed by determination device 110 are described in greater detail below with respect to, for example, FIGS. 4-8B.

Client device 120 may be a computing system operated by a user. For example, client device 120 may be a desktop computer, a laptop computer, a tablet computing device, a mobile phone, a server, and/or any other type of computing device. In some examples, client device 120 may be a computing device to perform operations consistent with certain disclosed implementations. For example, client device 120 may be adapted to display an actual visual representation generated by determination device 110.

Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as application instructions 127) to display a user interface, to detect a user action, to update the user interface in response to the user action, and/or to collect and/or transmit data associated with the user action. Machine-readable storage medium 124 may be any electronic, magnetic, optical, or other non-transitory storage device that stores instructions executed by processor 122. Display device 126 may be any type of display device that presents information, such as a user interface, to a user operating client device 120. Interface device 128 may be any combination of hardware and/or programming that facilitates the exchange of data between the internal components of client device 120 and external components, such as dynamic graphic entity determination device 110. In some examples, interface device 128 may include a network interface device that allows client device 120 to receive and send data to and from determination device 110 via network 140.

Database 130 may be any type of storage system configuration that facilitates the storage of data. For example, database 130 may facilitate the locating, accessing, and retrieving of data (e.g., SaaS, SQL, Access, etc. databases). Database 130 can be populated by a number of methods. For example, determination device 110 may populate database 130 with database entries generated by determination device 110, and store the database entries in database 130. As another example, determination device 110 may populate database 130 by receiving a set of database entries from another component, a wireless network operator, and/or a user of client device 120, and storing the set of database entries in database 130. The database entries can contain a plurality of fields, which may include information related to a proposed category (e.g., operating system type, device type, proposed category size etc.), a proposed subcategory (e.g., operation system version, device version, proposed subcategory size etc.), data within the proposed category/subcategory (e.g., user action response time), an assigned entity, an assigned subentity, a chart type, a display axis length, a display axis scale, and/or any other information related to accessed data, proposed visual representations, and/or actual visual representations. While in the example shown in FIG. 1 database 130 is a single component external to components 110 and 120, database 130 may comprise separate databases and/or may be part of devices 110, 120, and/or another device. In some implementations, database 130 may be managed by components of device 110 that are capable of accessing, creating, controlling and/or otherwise managing data remotely through network 140.

Network 140 may be any type of network that facilitates communication between remote components, such as determination device 110 and client device 120. For example, network 140 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1, shows one determination device 110, client device 120, database 130, and network 140, system 100 may include any number of components 110, 120, 130, and 140, as well as other components not depicted in FIG. 1. System 100 may also omit any of components 110, 120, 130, and 140. For example, determination device 110 and database 130 may be directly connected instead of being connected via network 140.

Figure 2:
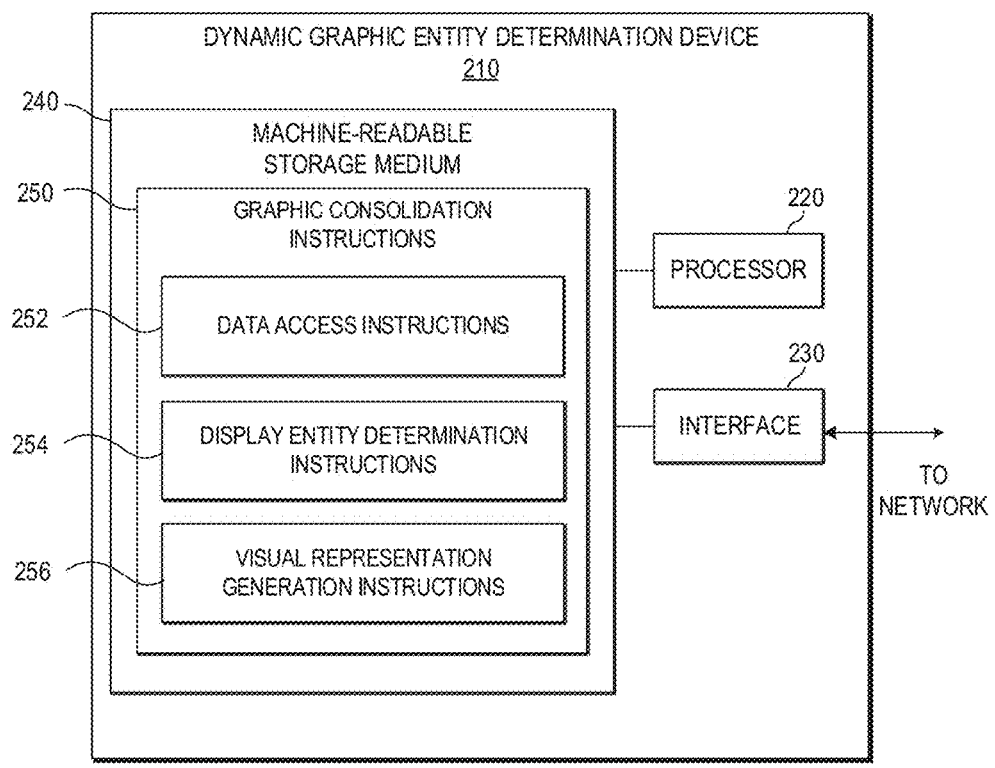
FIG. 2 is a block diagram of an example dynamic graphic entity determination device consistent with disclosed implementations.

FIG. 2 is a block diagram of an example dynamic graphic entity determination device 210 consistent with disclosed implementations. In certain aspects, dynamic graphic entity determination device 210 may correspond to dynamic graphic entity determination device 110 of FIG. 1. Determination device 210 may be implemented in various ways. For example, determination device 210 may be a special purpose computer, a server, a mainframe computer, a computing device executing instructions that receive and process information and provide responses, and/or any other type of computing device. In the example shown in FIG. 2, determination device 210 may include a processor 220, an interface 230, and a machine-readable storage medium 240.

Processor 220 may be at least one processing unit (CPU), microprocessor, and/or another hardware device to execute instructions to perform operations. For example, processor 220 may fetch, decode, and execute graphic entity determination instructions 250 (e.g., instructions 252, 254, and/or 256) stored in machine-readable storage medium 240 to perform operations related to disclosed examples.

Interface device 230 may be any device that facilitates the transfer of information between device 210 and external components, such as client device 120. In some examples, interface device 230 may include a network interface device that allows device 210 to receive and send data to and from network 140. For example, interface device 230 may transmit actual visual representations to client device 120 via network 140.

Machine-readable storage medium 240 may be any electronic, magnetic, optical, or other physical storage device that stores executable instructions. Thus, machine-readable storage medium 240 may be, for example, Random Access Memory (RAM), Electrically-Erasable Programmable Read-Only Memory (EEPROM), a storage drive, an optical disc, and the like. In some implementations, machine-readable storage medium 240 may be a non-transitory computer-readable storage medium, where the term "non-transitory" does not encompass transitory propagating signals. Machine-readable storage medium 240 may be encoded with instructions that, when executed by processor 220, perform operations consistent with disclosed implementations. For example, machine-readable storage medium 240 may include instructions that, when executed by a processing resource, perform operations that may dynamically determine entities to display on a chart. In the example shown in FIG. 2, machine-readable storage medium 240 may include data access instructions 252, display entity determination instructions 254, and visual representation generation instructions 256.

Data access instructions 252 may function to access data values. For example, when data access instructions 252 are executed by processor 220, data access instructions 252 may cause processor 220 of determination device 210, processor 122 of client device 120, and/or another processor to access data values from a storage device, such as machine-readable storage medium 240, database 130, and/or another storage device. As another example, data access instructions 252 may cause processor 220 of determination device 210, processor 122 of client device 120, and/or another processor to capture data related to a user action. Examples of these analyses are described in further detail below with respect to, for example, FIGS. 4 and 5.

Display entity determination instructions 254 may function to determine entities to display on a chart. For example, display entity determination instructions 254 may function to dynamically determine (e.g., determine during execution, rather than in advance) display entities to display on a chart. For example, when display entity determination instructions 254 are executed by processor 220, display entity determination instructions 254 may cause the processor 220 of determination device 210, the processor 122 of client device 120, and/or another processor to analyze the data to determine the entities to display. In some examples, the data may be analyzed to determine whether an overlap between a proposed graphic representing a category of data and a proposed graphic representing a subcategory of the category exceeds an overlap tolerance level. The overlap tolerance level may be based on a display axis range of a proposed visual representation of the data. Examples of this analysis are described in further detail below with respect to, for example, FIGS. 4 and 6.

Visual representation generation instructions 256 may function to generate an actual visual representation. For example, when visual representation generation instructions 256 are executed by a processor, such as processor 220 of determination device 210, visual representation generation instructions 256 may cause processor 220 of determination device 210, processor 122 of client device 120, and/or another processor to generate an actual visual representation based on the analysis of the data. In some examples, the actual visual representation may display a data set related to a particular subcategory of a category as a separate graphic from a graphic representing at least a portion of the remainder of the category (a "remainder graphic"). For example, the separate graphic may be set apart from the remainder graphic by a particular distance, may overlap the remainder graphic, or may be displayed in any way that sets the separate graphic apart from the remainder graphic in a manner consistent with disclosed implementations. In some examples, the actual visual representation may display a single consolidated graphic representing at least the category and the subcategory. These analyses are described in further detail below with respect to, for example, FIGS. 4, 7, 8A, and 8B.

Figure 3:
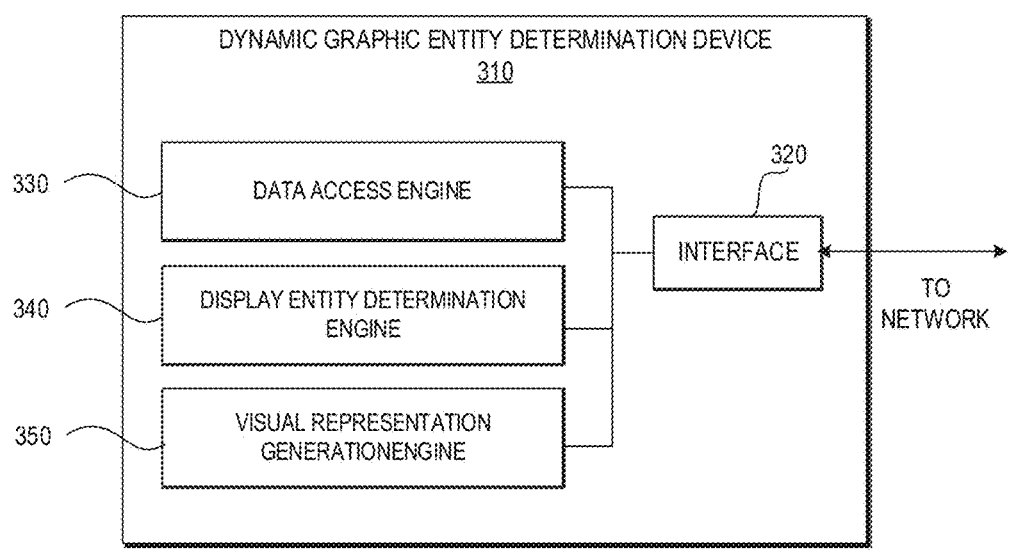
FIG. 3 is a block diagram of an example dynamic graphic entity determination device consistent with disclosed implementations.

FIG. 3 is a block diagram of an example dynamic graphic entity determination device 310 consistent with disclosed implementations. In certain aspects, dynamic graphic entity determination device 310 may correspond to dynamic graphic entity determination device 110 of FIG. 1. Device 310 may be implemented in various ways. For example, device 310, may be a special purpose computer, a server, a mainframe computer, a computing device executing instructions that receive and process information and provide responses, and/or any other type of computing device. In the example shown in FIG. 3, device 310 may include an interface device 320, a data access engine 330, a display entity determination engine 340, and a visual representation generation engine 350.

Interface device 320 may be any device that facilitates the transfer of information between dynamic graphic entity determination device 310 and external components, such as client device 120. In some examples, interface device 320 may include a network interface device that allows dynamic graphic entity determination device 310 to receive and send data to and from network 140. For example, interface device 320 may process and transmit data related to an actual visual representation to client device 120 via network 140.

Engines 330, 340, and 350 may be electronic circuitry for implementing functionality consistent with disclosed examples. For example, engines 320, 330, and 340 may represent combinations of hardware devices and programming to implement the functionality consistent with disclosed implementations. For example, the programming for the engines may be processor executable instructions stored on a non-transitory machine-readable storage medium and the hardware for the engines may include a processing resource to execute those instructions. While engines 330, 340, and 350 are illustrated separately in FIG. 3, engines 330, 340, and 350 may be implemented using the same components and/or combinations of hardware and programming.

In some examples, the functionality of engines 330, 340, and 350 may correspond to operations performed by dynamic graphic entity determination device 210 of FIG. 2, such as operations performed when graphic entity determination instructions 250 are executed by processor 220 (described above with respect to FIG. 2). In FIG. 3, data access engine 330 may represent a combination of hardware and programming that performs operations similar to those performed when processor 220 executes data access instructions 252. Similarly, display entity determination engine 340 may represent a combination of hardware and programming that performs operations similar to those performed when processor 220 executes display entity determination instructions 254, and visual representation generation engine 350 may represent a combination of hardware and programming that performs operations similar to those performed when processor 220 executes visual representation generation instructions 256.

Figure 4:
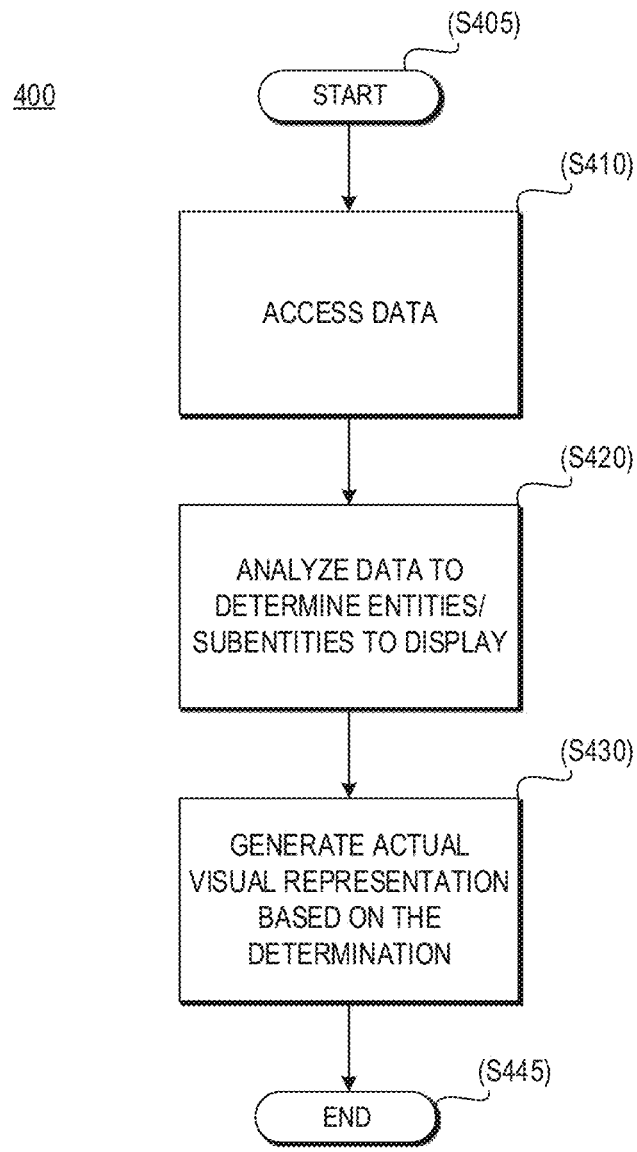
FIG. 4 is a flow chart of an example process for dynamic graphic entity determination consistent with disclosed implementations.

FIG. 4 is a flow chart of an example process 400 for dynamic graphic entity determination consistent with disclosed examples. Although execution of process 400 is described below with reference to system 100 of FIG. 1 and/or specific components of system 100, other suitable systems and devices for execution of at least one step of process 400 may be used. For example, processes described below as being performed by determination device 110 may be performed by dynamic graphic entity determination device 210, dynamic graphic entity determination device 310, and/or any other suitable device. Process 400 may be implemented in the form of executable instructions stored on a machine-readable storage medium and/or in the form of electronic circuitry.

After process 400 starts (step S405), process 400 may include accessing data (step S410). In some implementations, determination device 110 may access the data by accessing data stored in a machine-readable storage medium, in database 130, and/or in another storage device. For example, determination device 110 may include components for controlling access to database 130 such that determination device 110 can query database 130 to identify data entries that correspond to a particular dimension of data. In some implementations, determination device 110 may access the data by capturing and/or otherwise receiving data transmitted by another component, such as client device 120. For example, client device 120 may collect and/or store data related to a user action performed on client device 120 and transmit the user action data to determination device 110 via network 140. An example of steps that may be involved with accessing data are discussed in greater detail below with respect to, for example, FIG. 5.

Process 400 may also include analyzing the data to determine entities and/or subentities to display. In some implementations, determination device 110 may determine entities to display by determining whether an overlap between a proposed category graphic and a proposed subcategory graphic exceeds an overlap tolerance level. For example, each category and subcategory (and/or each proposed category and/or subcategory graphic) may have a display axis value. System 100 may determine the overlap by subtracting, for a particular category, the smallest subcategory display axis value from the largest subcategory display axis value. In some examples, system 100 may determine the overlap by determining a subentity range. For example system 100 may subtract, for a particular entity, the smallest subentity display axis value from the largest subentity display axis value. In some examples, system 100 may determine the overlap tolerance level based on a display axis range of a proposed visual representation. Examples of steps involved with analyzing the data are discussed in greater detail below with respect to, for example, FIG. 6.

Process 400 may also include generating an actual visual representation based on the determination of the entities and/or subentities to be displayed. For example, determination device 110 may access the determination of the entities and/or subentities to be displayed, determine at least one actual display axis, generate a graphical representation of the entities and/or subentities, position the graphical representation on the display axis, and/or store data related to the generation of the visual representation. Examples of steps involved with generating an actual visual representation based on the determination of the entities and/or subentities to be displayed are discussed in greater detail below with respect to, for example, FIG. 7.

After the data is accessed (step S410), the data is analyzed to determine entities and/or subentities to display (step S420), and/or the visual representation is generated (step S430), process 400 may end (step S455).

Figure 5:
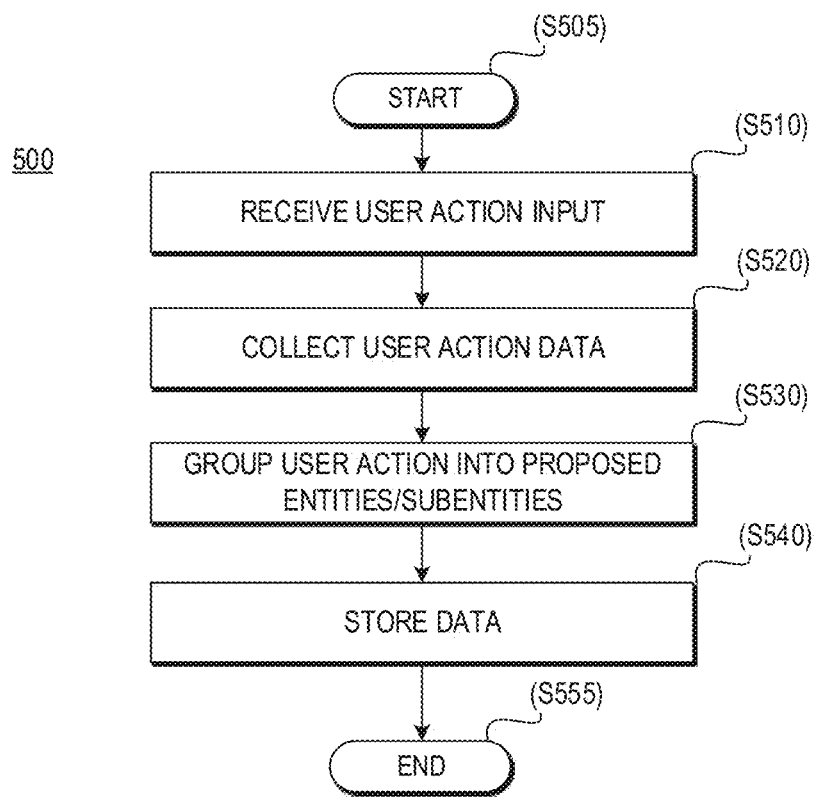
FIG. 5 is a flow chart of an example process for accessing data consistent with disclosed implementations.

FIG. 5 is a flow chart of an example process for accessing data consistent with disclosed implementations. Although execution of process 500 is described below with reference to system 100 of FIG. 1 and/or specific components of system 100, other suitable systems and devices for execution of at least one step of process 500 may be used. For example, processes described below as being performed by determination device 110 may be performed by client device 120, dynamic graphic entity determination device 210, dynamic graphic entity determination device 310, and/or any other suitable device. Process 500 may be implemented in the form of executable instructions stored on a machine-readable storage medium and/or in the form of electronic circuitry. In certain aspects, process 500 may relate to the processes associated with step S410 of FIG. 4.

Process 500 may start (step S505) after a user action has been performed on a user interface. For example, system 100 may receive a user action input (step S510), such as an input to client device 120. Example inputs may include, but are not limited to executing a mouse click, moving a mouse, executing a touch gesture on a touch-enabled display, executing a voice command, entry of numeric, alphanumeric, and/or other character strings, and/or any other type of input. The user action may correspond to a request from the user to provide additional content and/or otherwise receive a user interface response reflecting the content requested. Receipt of the user action input may cause client 120 to run several tasks or processes, some of which may function to update a user interface displayed on display device 126.

Upon performance of the user action, process 500 may continue by collecting user action data (step S520). For example, system 100 may collect data associated with the user action, such as the date and time of the user action, the device type associated with the user action, the operating system type associated with the user action, the operating system version associated with the user action, the device type associated with the user action, the device type version associated with the user action, a user interface response time, and/or other data associated with the user action. The user action data may be stored in a storage device, such as, for example, machine-readable storage medium 124, database 130, and/or the like.

Process 500 may also include grouping user actions into proposed entities and subentities (step S530). In some implementations, user actions may be grouped into a proposed entities and subentities based on proposed entity criteria. The proposed entity criteria may define the assignment of data (e.g., user action data) into a proposed entity and/or subentity based on a dimension of the data. For example, a first dimension of the data may be operating system type and a second dimension of the data may be operating system version. Thus, in some examples the proposed entity criteria may be used to assign user actions to proposed entities and/or subentities based on operating system type (e.g., operating system A, operating system B, etc.) and into subentities based on operating system version (A.1.1, A.1.2, A.4.4, B.1.1, B.1.7, etc.). The entity criteria may be predefined, or may be determined dynamically based on an analysis of the data.

Process 500 may also store data associated with the user action in a storage device (step S590). For example, device 110 may store data in a machine-readable medium, in database 130, and/or in any other suitable type of storage device. The stored data may include: information relating to the user action (e.g., the date/time of the user action, the client device type, the device operating system type, the device operating system version, a response time, etc.), the proposed entity and/or subentity associated with the user action (e.g., "entity A" and "subentity A.1.2"), and/or any other data related to the user action. After the data is stored, process 500 may end (step S545).

Figure 6:
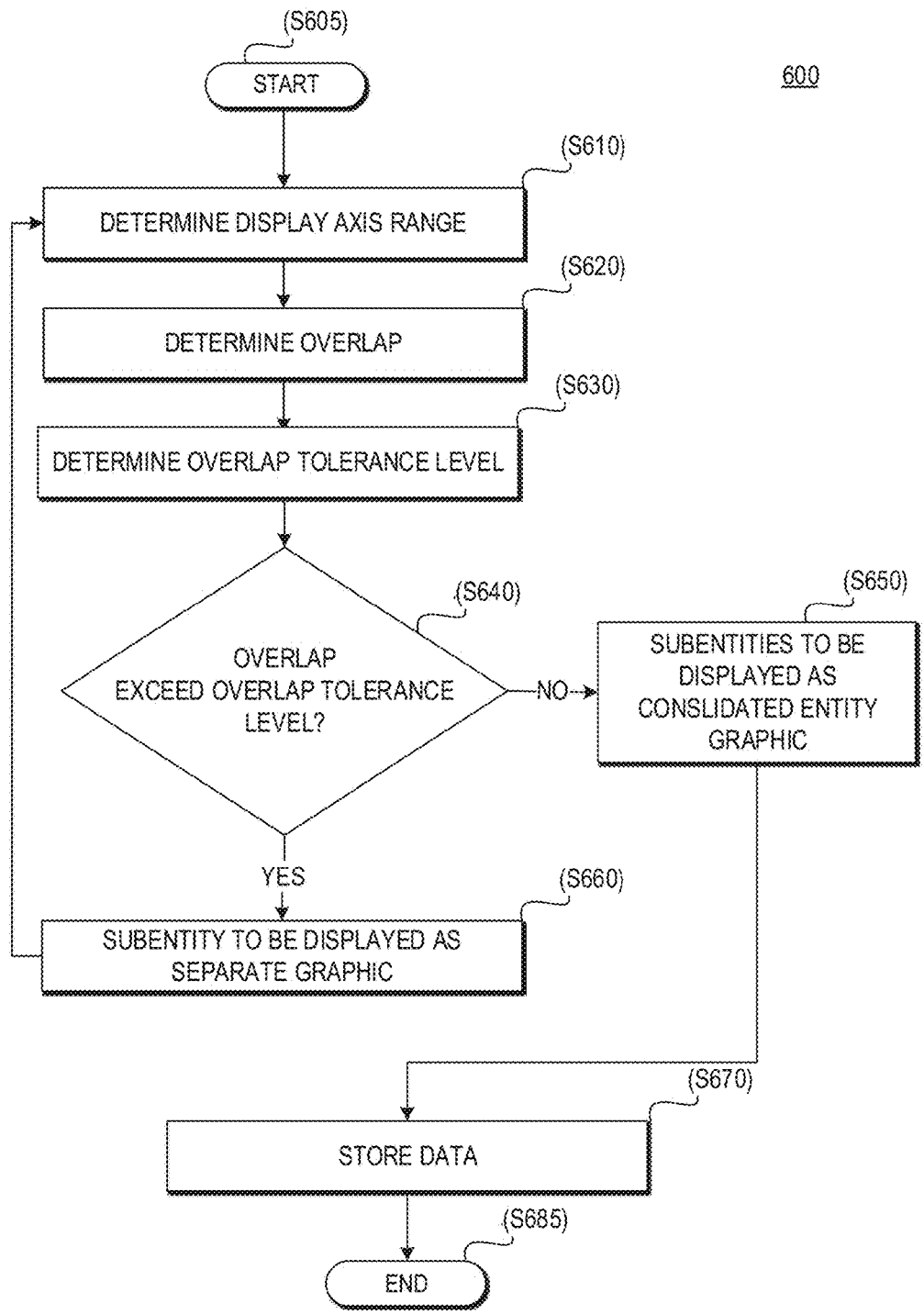
FIG. 6 is a flow chart of an example process for analyzing data consistent with disclosed implementations.

FIG. 6 is a flow chart of an example process 600 for analyzing data consistent with disclosed implementations. In some examples, process 600 may include analyzing data to determine a degree of overlap between a proposed entity graphic and a proposed subentity graphic. For example, process 600 may include determining a degree of overlap by determining a distance between a proposed entity graphic and a proposed subentity graphic. As another example, process 600 may include determining a degree of overlap by determining whether an overlap of a proposed subcategory graphic and a proposed category graphic exceeds an overlap tolerance level. Although execution of process 600 is described below with reference to system 100 of FIG. 1 and/or specific components of system 100, other suitable systems and devices for execution of at least one step of process 600 may be used. For example, processes described below as being performed by determination device 110 may be performed by dynamic graphic entity determination device 210, dynamic graphic entity determination device 310, and/or any other suitable device. Process 600 may be implemented in the form of executable instructions stored on a machine-readable storage medium and/or in the form of electronic circuitry. In certain aspects, process 600 may relate to the processes associated with step S420 of FIG. 4.

Process 600 may start (step S605) after data has been accessed. In some implementations, system 100 may determine entity information relating to the data that has been grouped into proposed entities and proposed subentities. System 100 may use the entity information to determine a proposed visual representation of the data. For example, system 100 may determine information relating to the grouped data (e.g., the total number of data values per entity and/or subentity, an average value of the data values associated with an entity/subentity, etc.) and/or use the information to determine the appearance of graphical representations of the proposed entity and/or subentities. In some implementations, the proposed visual representation may include proposed graphics representing the proposed entities, categories, subentities, and/or subcategories. For example, the proposed visual representation may be a bubble chart and the proposed graphics may be bubbles having a size corresponding to the total number of data values per category, entity, subcategory, and/or subentity. In some implementations, the proposed graphics may have a display axis value corresponding to an average value of the data values associated with the particular category, entity, subcategory, and/or subentity across at least one dimension of data. An example of a proposed visual representation is discussed in greater detail below with respect to, for example FIG. 8A.

Process 600 may include determining a display axis range of the proposed visual representation (step 3610). For example, in some implementations, the proposed visual representation may include at least one display axis, and a proposed graphic representing each entity and/or subentity may be positioned on the display axis based at least one dimension of the data grouped into the entity as well as the entity information. For example, the proposed visual representation may include a single display axis (e.g., an x-axis) and the display axis may have a minimum value corresponding to the smallest data value of the particular dimension of data (e.g., the smallest average entity response time) and a maximum value corresponding to the largest data value of the particular dimension of data (e.g., the largest average entity response time). Thus, in some examples, system 100 may determine the maximum category display axis value (e.g., the maximum display axis value of each of the categories to be displayed) and the minimum category display axis value (e.g., the minimum display axis value of each of the categories to be displayed), and the display axis may extend from the minimum category display axis value to the maximum category display axis value. Additionally, in some implementations, the proposed graphics representing each entity (e.g., operating system type) and/or subentity (e.g., operating system version) may be positioned and dimensioned on the display axis based on their relative values. Thus, in some examples, the display range may be determined based on the scale and/or relative length of the display axis (e.g., by subtracting the lowest display axis value of a proposed entity graphic from the highest display axis value of a proposed entity graphic).

Process 600 may also include determining an overlap (step S620). In some implementations, the overlap may be a number that represents a portion of a proposed entity graphic that overlaps a portion of a proposed subentity graphic if that graphic were to be and/or is displayed on the display axis. For example, the overlap may represent a subentity range (e.g., a range determined by subtracting, for a particular entity, the lowest subentity display axis value from the highest subentity display axis value). In some examples, the overlap may be determined based on relative position of the entity on at least one axis (e.g., x axis position, y axis position, etc), and/or entity size. For example, the overlap may be determined by subtracting, for a particular entity and/or category, the proposed subcategory graphic display axis value from the proposed category graphic display axis value. As another example, the overlap may be determined by determining the distance between a point in the proposed subcategory graphic and a point in the proposed category graphic and/or by calculating the area of overlap between the proposed category graphic and the proposed subcategory graphic. As another example, the overlap may be determined by subtracting, for a particular entity and/or category, the smallest proposed subcategory graphic display axis value form the largest proposed subcategory display axis value.

In some implementations, the overlap may depend not only on the sizes of the proposed entity and subentity graphics, but also on their relative position on the display axis as well as the scale of the display axis. For example, if the length of the display axis is fixed and/or the scale of the display axis is based on the smallest and largest entity display axis values, modifying the scale of the display axis may change the way the proposed graphics are displayed (e.g., their relative size and position) and thus modifying the scale may not only determine the degree of overlap between a proposed entity graphic and a proposed subentity graphic, but whether or not the proposed graphics overlap at all.

Process 600 may also include determining an overlap tolerance level (step S630). In some implementations, the overlap tolerance level may be a predetermined value. For example, system 100 may access a storage device, such as database 130 to determine the overlap tolerance level. In some implementations, the overlap tolerance level may be based on the display axis range. For example, the overlap tolerance level may be a certain percentage of the display axis range (e.g., 10% of the display axis range). In some implementations, the overlap tolerance level may be based on entity size, or a combination of entity size and display axis range.

Process 600 may also include determining whether the overlap exceeds the overlap tolerance level (step S640). For example, system 100 may compare the overlap to the overlap tolerance level to determine whether the overlap (e.g., the subentity range) is an amount larger than the display axis range. In some implementations, if system 100 determines that the overlap exceeds the overlap tolerance level (step S640; yes), system 100 may determine that the subcategory be displayed separately from other subcategories of the category (step S660). In some implementations, system 100 may determine that the subcategory is a first entity to display and at least a portion of the remainder of the category is a second entity to display. For example, system 100 may determine that the subcategory is a first actual entity to display and each remaining subcategory of the category is a separate actual entity to display (e.g., if a category has four subcategories, system 100 may determine that there are four entities to display, where each entity represents data associated with a particular subcategory). As another example, system 100 may determine that the subcategory is a first actual entity to display and that the remainder of the category is a second actual entity to display. As yet another example, system 100 may determine that the subcategory is a first actual entity to display, that the remaining portion of the category is a second proposed entity, and process 600 may return to step S610 to determine whether and how to break down the second proposed entity.

In some examples, if system 100 determines that the overlap does not exceed the overlap tolerance level (step S640; no), system 100 may determine that the entity to display is the category. Accordingly, in some examples, system 100 may determine that the subcategory and the category be displayed as a single consolidated graphic (step 3650). After the entities have been determined (step S650 and/or step S660), device 110 may provide data regarding the entity determination to a storage device, such as database 130, for storage and/or to another device for processing (step 3670). After the data is stored, process 600 may end (step S685).

The process illustrated in FIG. 6 is simply an example, and processes for analyzing data may have additional or fewer operations or combinations of operations. For example, system 100 may determine the display axis range and the sizes of the proposed entities and/or subentities to be display. With this information, system 100 may calculate the distance that each proposed entity and/or subentity graphic needs to be from another proposed entity graphic and/or subentity graphic such that any overlap between proposed graphics does not exceed the overlap tolerance level.

Figure 7:
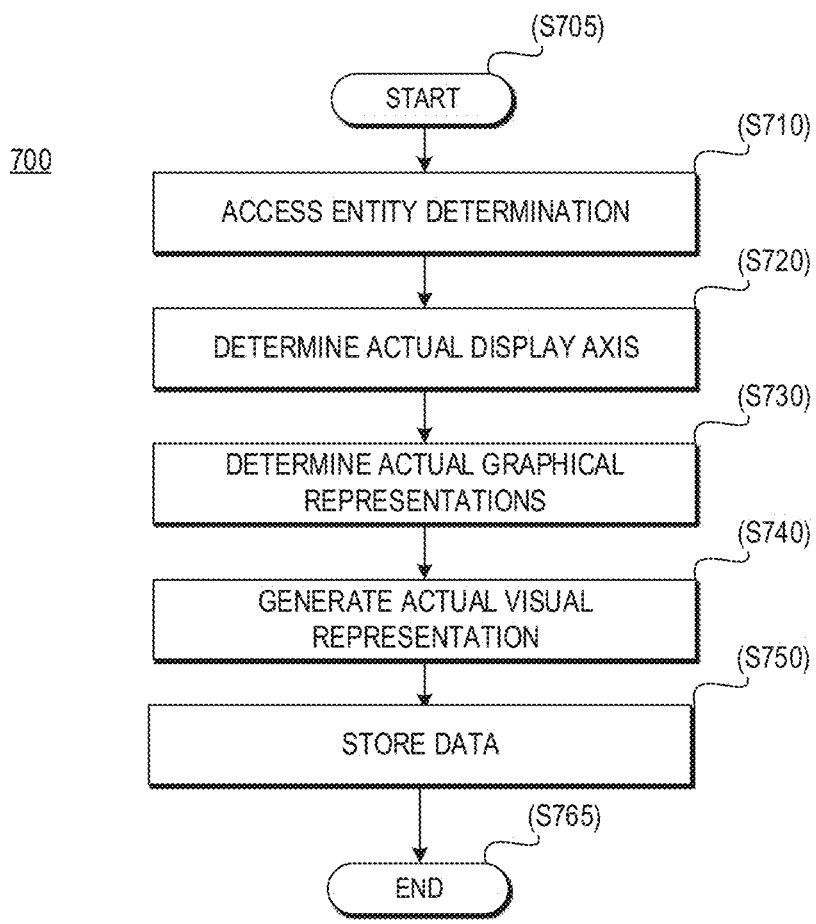
FIG. 7 is a flow chart of an example process for generating a visual representation consistent with disclosed implementations.

FIG. 7 is a flow chart of an example process 700 for generating an actual visual representation consistent with disclosed implementations. In some examples, process 700 may start (step S705) after system 100 determines which entities and/or subentities to display. Process 700 may include accessing data related to the entity determination (e.g., the determination in step S420 of FIG. 4) to determine the entities to that should be displayed (step 3710). For example, determination device 110 may access data stored in a machine-readable storage medium, in database 130, and/or in another storage device to identify the entities to display. Process 700 may also include determining at least one actual display axis based on the actual entities to be displayed (step S720). For example, in some implementations, the actual visual representation may include at least one axis with a minimum value corresponding to the smallest data value of an actual entity to be displayed (e.g., average response time) and a maximum value corresponding to the largest data value of an actual entity to be displayed.

Process 700 may also include determining the actual graphical representations of the entities and/or subentities (step 3730). In some implementations, the actual graphical representations may be discs and/or bubbles. For example, each entity may be a bubble having a size corresponding to the total number of data values associated with the entity and a display axis value corresponding to an average value of the data values associated with the entity. System 100 may scale a particular actual graphical representation based on the scale of the display axis and/or its relative size with respect to other actual entities. Furthermore, system 100 may determine a color and/or pattern of the actual graphical representation based on the category associated with the actual graphical representation. For example, system 100 may determine that each actual graphical representation of an entity associated with a particular category should have the same color and/or pattern. As another example, system 100 may determine that each entity representative of a subcategory (regardless of their associated category) should have the same color and/or pattern.

Process 700 may include generating the actual visual representation (step S740). In some examples, system 100 may generate the actual visual representation based on the determinations in steps S720 and S730. For example, system 100 may position the actual graphical representations on the display axis based on the relative value(s) of the entities they represent. After the actual visual representation has been generated, device 110 may provide data regarding the generation of the actual visual representation to a storage device, such as database 130, for storage and/or to another device for processing (step S765). An example of an actual visual representation is discussed in further detail below with respect to, for example, FIG. 8B.

Figure 8A:
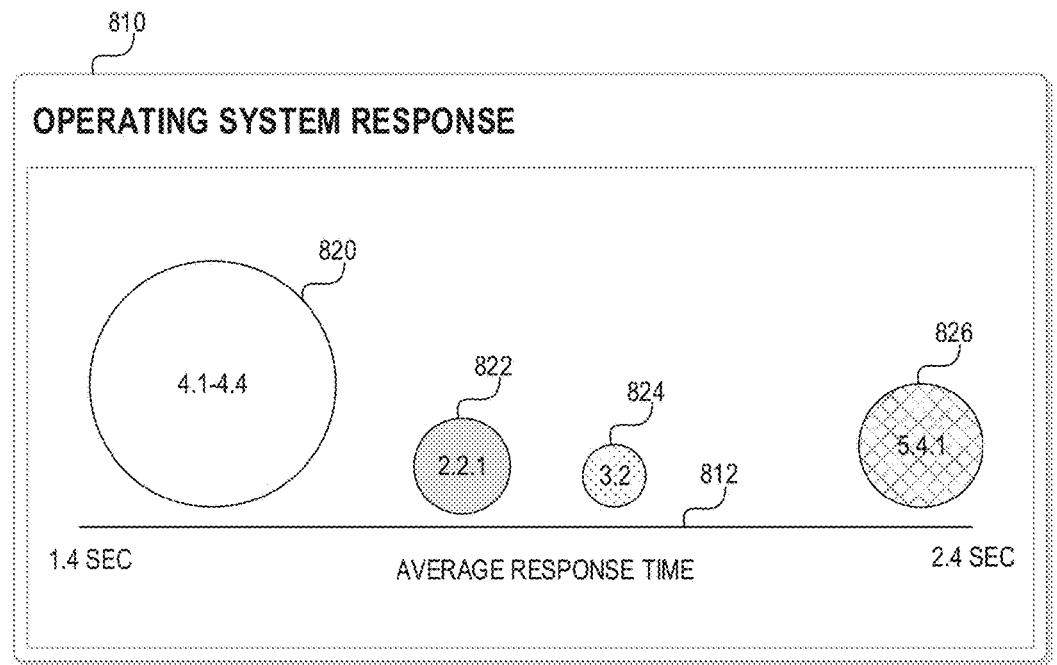
FIG. 8A is an example of a proposed visual representation.

FIG. 8A is an example of a proposed visual representation 810. While FIG. 8A illustrates a generated proposed visual representation, examples consistent with disclosed implementations need not generate a proposed visual representation (e.g., implementations need not generate a proposed visual representation to determine whether an overlap between proposed graphics exceeds an overlap tolerance value). Furthermore, while FIG. 8A illustrates a comparison of response times for an operating system type and operating system versions within that operating system type, proposed visual representations consistent with disclosed examples may be used to display any type of data.

In the example shown in FIG. 8A, bubble chart 810 has a single proposed display axis 812 with minimum and maximum values that correspond to the smallest and largest average response time values of proposed graphics 820, 822, 824, and 826. Graphics 820, 822, 824, and 826 may be considered to be single consolidated graphics that represent entire categories (and thus subcategories) of data. Graphic 820 represents operating system versions 4.1 through 4.4, graphic 822 represents operating system version 2.2.1, graphic 824 represents operating system version 3.2, and graphic 826 represents operating system 5.4.1. Thus, graphics 822, 824, and 826 represent both a category (e.g., operating system releases 2, 3, and 5, respectively) and a single subcategory (e.g., operating system release versions 2.1, 3.2, and 4.1, respectively). In contrast to graphics 822, 824, and 826, graphic 820 represents a category (e.g., operating system release 4), and multiple subcategories (e.g., release 4 versions 4.1, 4.2, 4.3, and 4.4). Each graphic 820, 822, 824, and 826 is colored and/or patterned based on the category of data it represents, relatively sized with respect to other graphics based on the total number of data values the graphic represents (e.g., total number of user actions), and positioned based on the average response time of the data associated with entity. As shown in FIG. 8A, based on the proposed visual representation, release 4 appears to have relatively fast response time when compared, for example, to release 5.

Figure 8B:
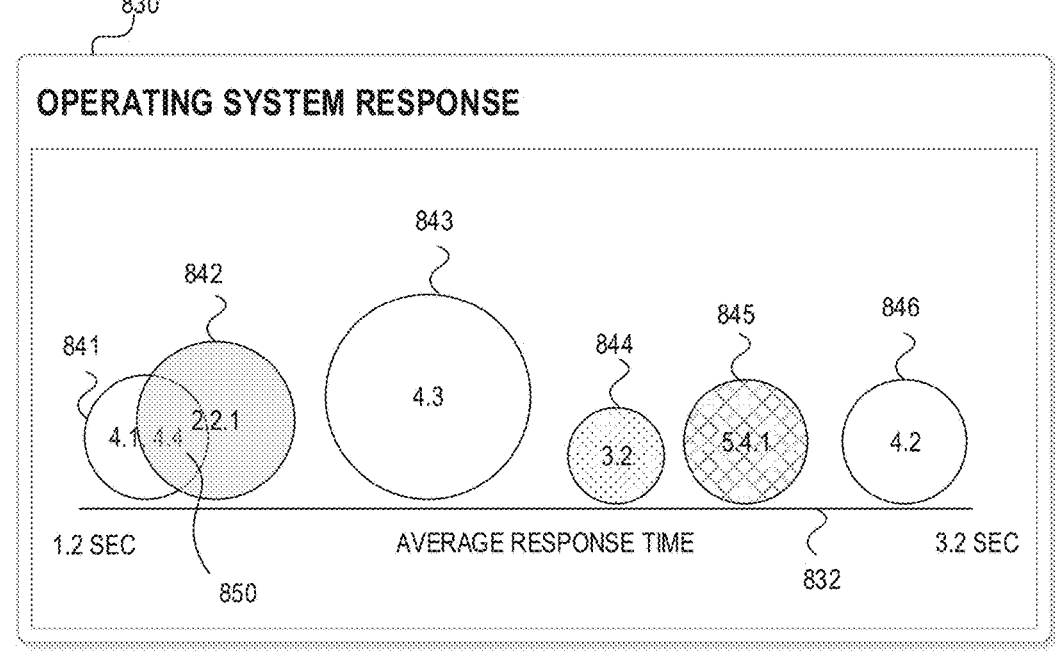
FIG. 8B is an example of an actual visual representation.

FIG. 8B is an example of an actual visual representation 830. For example, FIG. 8B may be an example of an actual visual representation of the data used to determine the proposed visual representation illustrated in FIG. 8A. For example, actual visual representation 830 may correspond to the actual visual representation generated during step S430 of FIG. 4, and thus the proposed representations shown in FIG. 8B and/or their associated data have been analyzed to redefine the entities displayed in FIG. 8A. Actual visual representation 830 may be transmitted by determination device 110 to a display device, such as a display device associated with an application content provider. The display device may display the actual visual representation 830.

Actual visual representation 830, like proposed visual representation 810, may include a single display axis 832 with minimum and maximum values that correspond to the smallest and largest average response time values of actual graphics 841, 842, 843, 844, 845, and 846. Graphic 841 represents operating system versions 4.1 and 4.4, graphic 842 represents operating system version 2.2.1, graphic 843 represents operating system version 4.3, graphic 844 represents operating system version 3.2, graphic 845 represents operating system 5.4.1, and graphic 846 represents operating system version 4.2. Each graphic 841 through 846 is colored and/or patterned based on the category of data it represents, relatively sized with respect to other graphics based on the total number of data values the graphic represents (e.g., total number of user actions), and positioned based on the average response time of the data associated with graphic. For example, graphics associated with operating system release 4 are colored white. As shown in FIG. 8B, graphics 841 and 842 include an overlap 850. This overlap 850 did not exceed an overlap tolerance level, and thus graphics 841 and 842 are separately displayed in an overlapping manner.

As shown in FIG. 8B, graphic 846 indicates that operating system version 4.2 has the slowest response time. Accordingly, operating system 4.2 may be experiencing significant performance problems, and has an unusual response time when compared to the remainder of the category. If this information had been displayed according to a particular predefined category, such as displayed in the manner shown in the illustration in FIG. 8A, the potential performance problem with operating system 4.2 would have been obscured from a user viewing the visual representation. Accordingly, the user may not have known to take action to determine and/or correct the error causing the slow response time.

The proposed visual representation 810 shown in FIG. 8A and the actual visual representation 830 shown in FIG. 8B are simply examples, and implementations consistent with the disclosure may include actual and proposed visual representations that differ from those shown in FIGS. 8A and 8B. For example, the actual and/or proposed display axis may have minimum and maximum values that are not based on the smallest average values of the entities displayed or to be displayed. As another example, the graphics may be any size and/or shape. As another example, the actual and/or proposed visual representations may have more than one display axis.

The disclosed examples may include systems, devices, computer-readable storage media, and methods for dynamic graphic entity determination. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Additionally, as used in the specification and the appended claims, the singular forms "a," "an," and "the" are intended to include the plural forms as well, unless the context indicates otherwise. Moreover, although the terms first, second, etc. may be used herein to describe various elements, these elements should not be limited by this terms. Instead, these terms are used to distinguish one element from another. Additionally, while the specification refers to entities and subentities, in some instances a subentity (and/or a subcategory) may be considered to be an entity, such as when it is determined data representing a subentity (and/or subcategory) should be represented as a separate graphic.

Further, the sequence of operations described in connection with FIGS. 1-8 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those in FIGS. 4-7. Thus, the present disclosure merely sets forth possible examples of implementations, and many variations and modifications may be made to the described examples. All such modifications and variations are intended to be included within the scope of this disclosure and protected by the following claims.

We claim:

1. A system for dynamic graphical entity determination comprising:
   a processor; and
   a memory on which is stored instructions that when executed by the processor, cause the processor to:
      access data values, each data value of the accessed data values being associated with a category of a plurality of categories and a subcategory of a plurality of subcategories of the category;
      analyze the data values to determine whether an overlap of a proposed graphic representing the subcategory and a proposed graphic representing the category exceeds an overlap tolerance level, wherein the overlap tolerance level is based on a display axis range of the proposed graphic representing the subcategory and the proposed graphic representing the category; and
      generate an actual visual representation based on the analysis, wherein the actual visual representation:
         displays a single consolidated graphic representing at least the category and the subcategory based on the overlap not exceeding the overlap tolerance level; and
         displays the subcategory as a separate graphic from a graphic representing at least a portion of a remainder of the category based on the overlap exceeding the overlap tolerance level.

2. The system of claim 1, wherein each subcategory of the plurality of subcategories is displayed as a separate graphic if the overlap exceeds the overlap tolerance level.

3. The system of claim 1, wherein the analysis of the data values is based on a proposed visual representation including a plurality of proposed graphics representing each category of the plurality of categories, the plurality of proposed graphics including the proposed graphic representing the category.

4. The system of claim 3, wherein the analysis of the data values is based on at least one of a scale of a display axis of the proposed visual representation and a size of at least one of the plurality of proposed graphics.

5. The system of claim 3, wherein:
   each category and each subcategory has a display axis value;
   the category is a first category having a first category display axis value;
   the subcategory is a first subcategory having a first subcategory display axis value; and
   analyzing the data comprises:
      determining a maximum category display axis value and a minimum category display axis value;
      determining a display axis range of the proposed visual representation, the display axis extending from the minimum category display axis value to the maximum category display axis value;
      determining the overlap tolerance level based on the display axis range; and determining the overlap by subtracting, for the first category, the first subcategory display axis value from the first category display axis value.

6. The system of claim 1, wherein:
the category is operating system type;
the subcategory is operating system version; and
the display axis values are average response times.

7. The system of claim 1, wherein:
the proposed graphic representing the subcategory is a first bubble having a first size corresponding to a total number of data values associated with the subcategory and having a display axis value corresponding to an average value of the data values associated with the subcategory;
the proposed graphic representing the category is a second bubble having a second size corresponding to a total number of data values associated with the category and a display axis value corresponding to an average value of the data values associated with the category; and
the actual visual representation is a bubble chart.

8. A non-transitory computer-readable storage medium including instructions which, when executed by a processor, cause the processor to:
access data associated with user actions, each of the user actions being grouped into:
at least one proposed entity of a plurality of proposed entities based on a first dimension of the data; and
at least one proposed subentity of the proposed entity based on a second dimension of the data;
dynamically determine whether to display at least a portion of a proposed entity as a single consolidated graphic or as at least two separate graphics, the determination being based on a degree of overlap between a proposed entity graphic representing the proposed entity and a proposed subentity graphic representing the proposed subentity, wherein the degree of overlap is based on a scale of a display axis of a proposed visual representation including a graphical representation of each of the plurality of proposed entity graphics and subentity graphics, the scale of the display axis being based on at least the entity with a maximum average data value across a third dimension of the data; and
generate an actual visual representation of the data based on the dynamic determination.

9. The computer-readable storage medium of claim 8, the instructions causing the processor to determine the degree of overlap, wherein:
each entity and each subentity has a display axis value;
to determine the degree of overlap, the instructions are further to cause the processor to:
determine a display axis range by subtracting a minimum entity display axis value from a maximum entity display axis value; and
determine a subentity range by subtracting a minimum subentity display axis value from a maximum subentity display axis value; and
determine whether the subentity range is an amount larger than the display axis range, the amount corresponding to an overlap tolerance level.

10. The computer-readable storage medium of claim 8, wherein:
the actual visual representation is a bubble chart;
the single consolidated graphic and the at least two separate graphics are bubbles having a display axis value based on the third dimension of the data and a size based on a fourth dimension of the data; and
the instructions are further to cause the processor to display the actual visual representation on a display device.

11. The computer-readable storage medium of claim 10, wherein the first dimension of the data is operating system type, the second dimension of the data is operating system version, the third dimension of the data is average response time, and the fourth dimension of the data is total number of user actions associated with the entity.

12. The computer-readable storage medium of claim 8, the degree of overlap indicating whether an overlap between the proposed entity graphic and the proposed subentity graphic exceeds an overlap tolerance level.

13. A computer-implemented method for dynamic graphic entity determination comprising:
dynamically determining, via a processor, entities to display on a chart, wherein dynamically determining the entities includes:
grouping data values into proposed entities and proposed subentities based on proposed entity criteria, each proposed entity including an average entity value and each proposed subentity include an average subentity value;
determining a display axis range by subtracting a minimum proposed average entity value from a maximum proposed average entity value;
determining a subentity range by subtracting a minimum proposed average subentity value from a maximum proposed average subentity value;
determining if the subentity range is greater than an amount of the display axis range;
if the subentity range is greater than the amount, grouping the data associated with the proposed subentity into a first actual entity and the remaining data associated with the proposed entity into a second actual entity; and
if the subentity range is less than the amount, grouping the data associated with the proposed entity into a first actual entity.

14. The computer-implemented method of claim 13, further comprising:
displaying the chart, the chart including at least one graphic representing at least one of the first actual entity and the second actual entity,
wherein the first actual entity graphic and the second actual entity graphic are displayed as bubbles, and
wherein each bubble representing data from the same proposed entity has the same color.

* * * * *